United States Patent [19]

Mattos et al.

[11] Patent Number: 5,765,147

[45] Date of Patent: Jun. 9, 1998

[54] QUERY REWRITE FOR EXTENDED SEARCH CAPABILITIES

[75] Inventors: Nelson Mendonca Mattos, San Jose, Calif.; Stefan Dessloch, Herrenberg, Germany

[73] Assignee: International Business Machines Corporation, Armonk, N.Y.

[21] Appl. No.: 753,327

[22] Filed: Nov. 21, 1996

[51] Int. Cl.$^6$ .................................................... G06F 17/30
[52] U.S. Cl. ................................................... 707/4; 707/2
[58] Field of Search ............................. 707/2, 102, 203, 707/10, 8; 395/600, 670

[56] References Cited

U.S. PATENT DOCUMENTS

| | | | |
|---|---|---|---|
| 5,423,035 | 6/1995 | DePrez | 707/1 |
| 5,546,576 | 8/1996 | Cochrane | 707/1 |
| 5,630,120 | 5/1997 | Vachey | 707/1 |
| 5,675,785 | 10/1997 | Hall et al. | 707/102 |

OTHER PUBLICATIONS

Lohman, G., et al., "Extensions to Starburst: Objects, Types, Functions, and Rules," *Communications of the ACM*, vol. 34, No. 10, 94–109, Oct. 1991.

"Database 2 Text Extender: Administration and Programing", manual, IBM Corp. (US), Jun. 1996, pp. 1–99.

*Primary Examiner*—Thomas G. Black
*Assistant Examiner*—Shahid Alam
*Attorney, Agent, or Firm*—Merchant, Gould, Smith, Edell, Welter, & Schmidt

[57] ABSTRACT

A method, apparatus, and article of manufacture for optimizing queries in a database management system, wherein the queries comprise content-based searches of data types that are supported through the use of appropriate indexing techniques not known or available to the database management system. The queries are automatically rewritten or optimized to take advantage of the indexing techniques.

14 Claims, 4 Drawing Sheets

QUERY REWRITE FOR EXTENDED SEARCH CAPABILITIES

BACKGROUND OF THE INVENTION

1. Field of the Invention

This invention relates in general to database management systems performed by computers, and in particular, to the optimization of queries in a database management system that supports extended search capabilities such as relational extenders.

2. Description of Related Art

Relational DataBase Management System (RDBMS) software sing a Structured Query Language (SQL) interface is well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

RDBMS, software has typically been used with databases comprised of traditional data types that are easily structured into tables. However, some vendors have proposed and offered RDBMS software that can be used with text, video, audio, image, time series, spatial, and other non-traditional data types. As a result, there is a need in the art for enhanced access methods and structures for non-traditional data types.

SUMMARY OF THE INVENTION

To overcome the limitations in the prior art described above, and to overcome other limitations that will become apparent upon reading and understanding the present specification, the present invention discloses a method, apparatus, and article of manufacture for optimizing queries in a database management system, wherein the queries comprise content-based searches of data types that are supported efficiently through the use of indexing techniques not known and/or managed by the database management system. The indexing techniques are provided by an extended search capability that is external to the database management system. The queries are automatically rewritten or optimized to take advantage of the indexing techniques.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
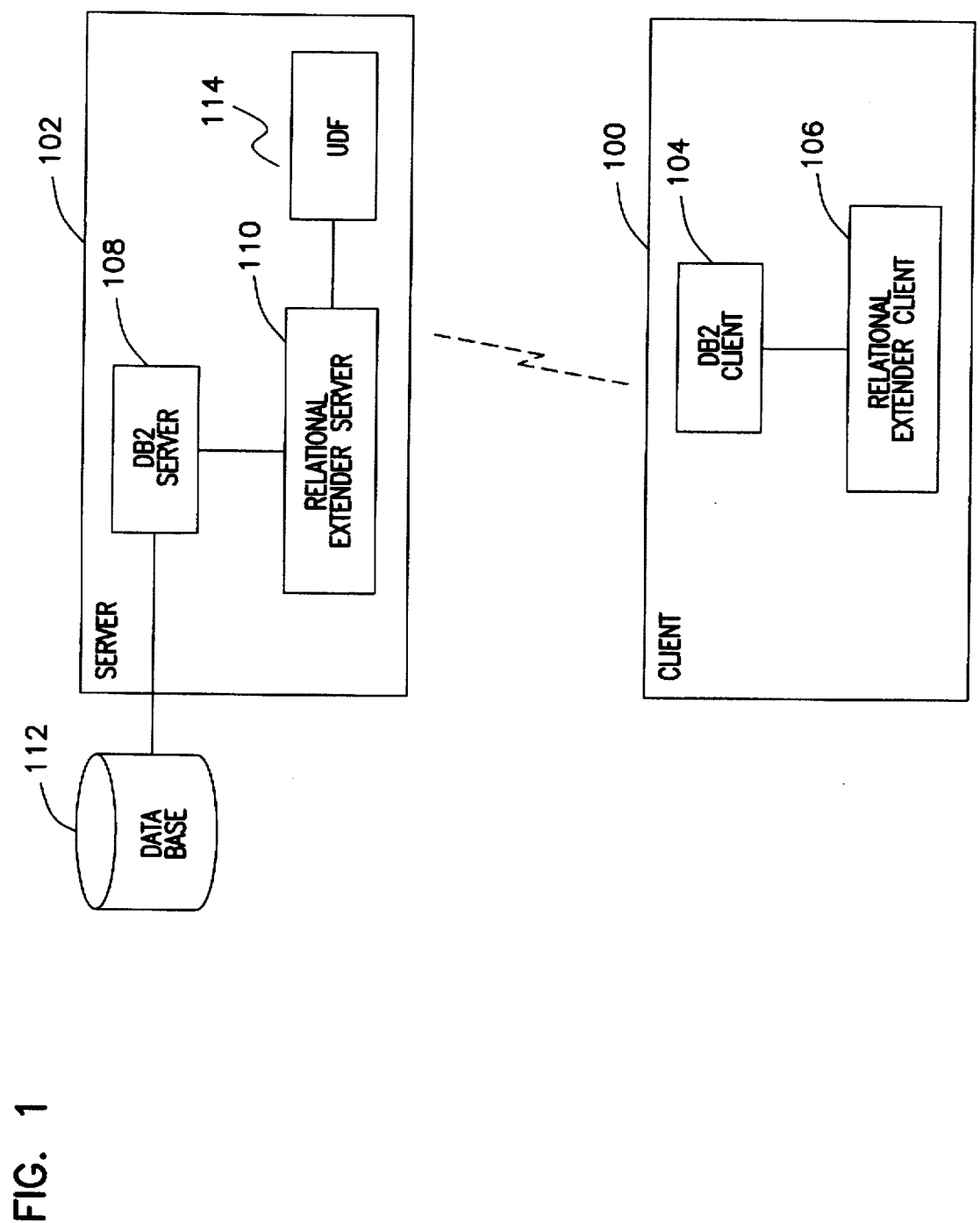
FIG. 1 is a block diagram illustrating an exemplary hardware environment used to implement the preferred embodiment of the invention.

FIG. 1 is a block diagram illustrating an exemplary hardware environment used to implement the preferred embodiment of the invention. In the exemplary hardware environment, a client/server architecture is illustrated comprising a client computer 100 coupled to a server computer 102. Both the client computer 100 and server computer 102 may include, inter alia, processors, random access memory (RAM), read-only memory (ROM), keyboard, display, fixed and/or removable data storage devices, and data communications devices. Those skilled in the art will recognize that any combination of the above components, or any number of different components, peripherals, and other devices, may be used with the client computer 100 and server computer 102. Those skilled in the art will also recognize that the present invention may be implemented on a single computer, rather than multiple computers networked together.

The present invention is typically implemented using relational database management system (RDBMS) software, such as the DB2 product sold by IBM Corporation, although it may be implemented with any database management system (DBMS) software. In the example illustrated in this application, the RDBMS software includes a DB2 client program 104 and Relational Extender client program 106 executed by the client computer 100 and a DB2 server program 108 and Relational Extender program 110 executed by the server computer 102. These programs execute under the control of an operating system on their respective computers 100 or 102, such as OS/2, WINDOWS, AIX, MVS, UNIX, etc. Those skilled in the art will recognize that any combination of the above programs, or any number of different programs, may be used to implement the present invention.

The DB2 client program 104 and the Relational Extender client program 106 generate commands for performing various search and retrieval functions, termed queries, against the databases 112 managed by the DB2 server program 108 and the Relational Extender server program 110. In the preferred embodiment, these queries conform to the Structured Query Language (SQL) standard, although other types of queries could also be used without departing from the scope of the invention. The queries invoke functions performed by the DB2 server program 108 and the Relational Extender server program 110, such as definition, access control, interpretation, compilation, database retrieval, and update of user and system data Generally, the RDBMS software, the SQL queries, and the instructions derived therefrom, are all tangibly embodied in or readable from a computer-readable medium, e.g. one or more data storage devices and/or data communications devices. Moreover, the RDBMS software, the SQL queries, and the instructions derived therefrom, are all comprised of instructions which, when read and executed by the client computer 100 and/or the server computer 102, causes the client computer 100 and/or the server computer 102 to perform the steps necessary to implement and/or use the present invention.

Relational Extenders

The Relational Extender client 106 and Relational Extender server 110 together comprise a Relational Extender system that supplements the retrieval capabilities of the DB2 client program 104 and the DB2 server program 108. Detailed information concerning one type of DB2 Relational Extenders can be found in "DATABASE 2 Text Extender—Administration and Programming", IBM Corporation, June 1996, incorporated by reference herein.

Relational Extenders provide content-based search capabilities to RDBMS software for new data types such as text, image, video, audio, spatial, time series, etc. Generally, there is a different Relational Extender for each data type, such as the DB2 Text Extender for text data types mentioned above. With Relational Extenders, end-users can store text, video, audio, etc., in tables, together with traditional data, by simply adding columns of the appropriate data types provided by the Relational Extenders.

User-defined data types (UDTs) describe the attributes of this new data. UDTs, like built-in data types, can be used to define columns of tables and parameters of functions. Simple examples of UDTs may include text, video, and audio.

User-defined functions (UDFs) are used to define arbitrarily complex operations that can be invoked in SQL queries and executed by the RDBMS software. The UDFs provide the means to initialize, update, and search on UDTs. For illustration purposes, FIG. 1 shows the UDFs 114 as being stored on the server computer 102 in a manner that makes them accessible from the Relational Extender server program 110.

Content-based searches over tables in the database 112 containing these new data types are supported efficiently within the Relational Extender through the use of appropriate indexing techniques. The implementation is transparent to the user, however, who simply formulates his or her search requests as SQL queries that involve functions provided by the Relational Extender.

An important advantage of this approach to supporting content-based searches is that a given SQL query can search on non-traditional data types without additional programming or pre-processing steps; instead, they can be directly specified with other search criteria on other data in the same SQL query. As a result, there is essentially no limit to the ways in which SQL queries can combine non-traditional data predicates.

Nonetheless, there exist certain performance issues associated with the retrieval of non-traditional data types using Relational Extenders. The present invention provides a method that efficiently supports searches on UDTs when the search mechanism (e.g., index) for the UDTs is not known by or available to the RDBMS software, but instead is supported by the enhanced search capabilities provided by the Relational Extender.

In the present specification, an explanation is provided for several concepts associated with the present invention, including:

why UDFs with table functions and SQL in UDF bodies are essential for Relational Extenders, why Relational Extenders need an automatic query rewrite method for performance reasons, and how this query rewrite method can be generalized to support "index UDFs", i.e., UDFs that produce output comparable to an "index lookup" for search functionality implemented in other UDFs.

In the following sections of the present specification, an example of a typical text search query using a Text Extender is provided, along with a suggested query rewrite method for performance enhancement when large tables are involved in the query. In order to hide the query rewrite method from the end-user, for obvious reasons, SQL in table-valued UDFs can be used. However, the full benefit is only available if an automatic query rewrite method replaces the original query with a query that uses table-valued UDFs. The query rewrite method is also generalized to UDFs involved in arbitrary predicates (such as numerical comparison operators other than "=").

Note, however, that the approach outlined herein is by no means restricted to the usage by the Text Extender of the example query, because it can be equally well exploited by other Relational Extenders or any other software that can exploit index structures not known by the RDBMS for the evaluation of queries.

Example Query

The following SQL query provides an example of the use of the Text Extender:

```
SELECT *
    FROM MYTEXTTABLE
    WHERE VERSION = '2'
    AND DB2TX.CONTAINS (
        DB2BOOKS,
        '"AUTHORIZATION" IN SAME PARAGRAPH
        AS "TABLE" AND SYNONYM FORM OF
        "DELETE"' ) = 1
```

In the above query, MYTEXTTABLE is the table to be searched. VERSION is the name of a column in MYTEXTTABLE containing version numbers to be searched. DB2TX.CONTAINS is a UDF (identified as CONTAINS) of the Text Extender (identified as DB2TX) that is used to perform a search. DB2BOOKS is the name of a column in MYTEXTTABLE containing the text to be searched by the DB2TX.CONTAINS UDF, and the portion of the query between the single quotes is an example of a search argument for the DB2TX.CONTAINS UDF.

The performance of the above search can be enhanced through use of an index. The index contains, for example, significant words from the text column of the table together with a list of the entries in the table that contain the words, so that searches can be made through the index rather than the text column itself.

In the example illustrated in this application, when an index is created for a text column of a table, a handle column is added to the table. The handle column identifies the name and location of the index associated with the text column. Thereafter, an SQL query specifies the handle column, not the text column, as the column to be searched. However, any column containing the text and the information about the index as subfields, or any other structure used to locate rows, could be used in place of a handle column.

Consider the following example query:

```
SELECT *
    FROM MYSCHEMA.MYTEXTTABLE
    WHERE DB2TX.CONTAINS (
```

-continued

```
HANDLECOL,
    ("DATABASES" | "DB2/6000" ) = 1
```

In the above query, MYSCHEMA.MYTEXTTABLE is the table to be searched, DB2TX.CONTAINS is a UDF in the Text Extender that is used to perform the search, HANDLECOL is the name of a handle column in MYTEXTTABLE containing information concerning the index to be searched, the portion of the query between the single quotes is an example of a search argument for the DB2TX.CONTAINS function, i.e., search for "DATABASES" or "DB2/6000" in the text, and "=1" indicates that all entries that satisfy the comparison should be retrieved (i.e., all "true" conditions).

Although the use of indexes provides some performance improvements, other steps can also be taken to enhance the performance of Relational Extenders. For example, the above query could be rewritten for enhanced performance as follows:

```
WITH REPHANDLE ( MYDOCHANDLE ) AS                        1
    ( SELECT DB2TEXTH( PROTOTYPEHANDLE )
      FROM DB2TX.TEXTCOLUMNS
      WHERE TABLESCHEMA = 'MYSCHEMA' AND
            TABLENAME   = 'MYTEXTTABLE' AND
            HANDLENAME  = 'HANDLECOL' ),
    ROWRESULTLIST (RESULTDOCLIST) AS                     2
    ( SELECT DB2TX.HANDLE_LIST(
        MYDOCHANDLE,
        "DATABASE" | "DB2/6000"")
      FROM REPHANDLE ),
    MATCHTABLE (                                         3
        HANDLE,
        RESULTDOCLIST,
        CARDINALITY,
        NUMBER) AS
    ( SELECT DB2TX.HANDLE( RESULTDOCLIST, 1 ),
        RESULTDOCLIST,
        DB2TX.NO_OF_DOCUMENTS( RESULTDOCLIST ),
        1
      FROM ROWRESULTLIST
      WHERE
        DB2TX.NO_OF_DOCUMENTS( RESULTDOCLIST ) > 0
      UNION ALL
      SELECT DB2TX.HANDLE ( RESULTDOCLIST, NUMBER+1 ),
        RESULTDOCLIST,
        CARDINALITY,
        NUMBER+1
      FROM MATCHTABLE
      WHERE NUMBER < CARDINALITY )
SELECT *                                                 4
    FROM MYSCHEMA.MYTEXTTABLE
    WHERE HANDLECOL IN
      ( SELECT HANDLE FROM MATCHTABLE )
```

The above rewritten query is divided into sections indicated by the numbered vertical bar along the right side of the page. Each section is described below.

In section 1, a temporary table REPHANDLE having a single column MYDOCHANDLE is created to store the results from the immediately following SELECT clause. The SELECT clause retrieves a PROTOTYPEHANDLE (of type DB2TEXTH, which indicates a handle) from DB2TX.TEXTCOLUMNS. DB2TX.TEXTCOLUMNS is a catalog view maintained by the Text extender that describes information concerning the tables and columns that are enabled for the Text Extender. DB2TX.TEXTCOLUMNS includes the columns TABLESCHEMA (the schema of the table to which the entry applies), TABLENAME (the name of the table to which the entry applies), HANDLENAME (the name of the handle column to which the entry applies), and PROTOTYPEHANDLE (the name of a handle column for use in performance UDFs that contains the name of the index for the text column). The PROTOTYPEHANDLE for the entry associated with TABLESCHEMA= 'MYSCHEMA', TABLENAME='MYTEXTTABLE', and HANDLENAME='HANDLECOL' is stored in the temporary table REPHANDLE.

In section 2, a temporary table ROWRESULTLIST having a single column RESULTDOCLIST is created to store the results from the immediately following SELECT clause. The SELECT clause invokes the HANDLE_LIST UDF of the Text Extender. The HANDLE_LIST UDF has two parameters: (1) the column MYDOCHANDLE from the table REPHANDLE that contains the prototype handle extracted from the DB2TX.TEXTCOLUMNS catalog view; and (2) the search argument '"DATABASES"|"DB2/6000"' from the original query. The HANDLE_LIST UDF searches for entries that match the search argument and returns a pointer to a list of handles for the found documents. The pointer is then stored in column RESULTDOCLIST of the table ROWRESULTLIST.

In section 3, a temporary table MATCHTABLE having columns HANDLE, RESULTDOCLIST, CARDINALITY, and NUMBER is created to store the results from the immediately following SELECT, UNION, and SELECT clauses. The SELECT, UNION, and SELECT clauses recursively extract handles from the table ROWRESULTLIST using the HANDLE UDF of the Text Extender, wherein the first SELECT clause performs the initial retrieval, and the UNION and second SELECT perform additional retrievals according to the number of entries in the list of handles, as determined by the NO_OF_DOCUMENTS UDF in the Text Extender. The HANDLE UDF has two parameters: (1) a pointer to a list of handles (i.e., RESULTDOCLIST from the table ROWRESULTLIST); and (2) a sequence number for a particular handle in the list. Each of the text handles returned by the HANDLE UDF are stored in the table MATCHTABLE.

In section 4, the table MATCHTABLE is joined to the original table MYSCHEMA.MYTEXTTABLE and search results are retrieved for entries where the HANDLECOL column in the MYSCHEMA.MYTEXTTABLE table matches the HANDLE column in the MATCHTABLE table, i.e., those documents containing "DATABASES" or "DB2/6000".

Although the above rewritten query enhances the performance of the Text Extender, it is extremely hard to understand. As a result, almost no one will ever use this rewritten query.

CONTAINSTABLE UDF

The present invention provides a new UDF (the CONTAINSTABLE UDF) that encapsulates most of the query rewrite method set forth above. The CONTAINSTABLE UDF is defined by the following:

```
CREATE FUNCTION DB2TX.CONTAINSTABLE
    (VARCHAR(8),     /* SCHEMANAME      */
     VARCHAR(18),    /* TABLENAME       */
     VARCHAR(18),    /* HANDLENAME      */
     LONG VARCHAR)   /* SEARCH ARGUMENT */
RETURNS TABLE(RESULTHANDLE DB2TEXTH) ;
```

In the body of the CONTAINSTABLE UDF, the following steps are performed:

retrieve the prototype handle for (SCHEMANAME, TABLENAME, HANDLENAME) in order to retrieve of the index name (section 1 in the query rewrite above), compute the list of matching handles (section 2 in the query rewrite above), and construct a result table that contains one row per matching document (section 3 in the query rewrite above).

The CONTAINSTABLE UDF is compiled and stored in a manner that makes it available for invocation by SQL queries.

An SQL query invoking the CONTAINSTABLE UDF would look something like the following:

```
SELECT *
FROM MYSCHEMA.MYTEXTTABLE
WHERE HANDLECOL IN
    (SELECT RESTAB.RESULTHANDLE
     FROM DB2TX.CONTAINSTABLE(
        'MYSCHEMA',
        'MYTEXTTABLE',
        'HANDLECOL',
        '"DATABASES" | "DB2/6000"')
     AS RESTAB)
```

Note that, for this approach to perform well, there has to be an index on the handle column of the base table (i.e., MYSCHEMA.MYTEXTTABLE.HANDLECOL in the example above). Otherwise, the query will result in a table scan on MYSCHEMA.MYTEXTTABLE during the join. The same prerequisite holds for the query rewrite above.

In the DB2 product, for example, the Text Extender automatically creates an index on the handle column when the end-user enables a text column for text searches using administrative commands in the Text Extender. The advantage is that the query now is much easier to understand, but there still there are disadvantages.

One disadvantage is that the end-user has to decide to use the CONTAINSTABLE UDF in the SQL query. Thus, it is more advantageous if the optimizer function of the RDBMS software itself chooses to apply the query rewrite method automatically, if the underlying base table is large enough (for small tables, the simple query in the example may be faster, because it does not require the additional lookup of the prototype handle).

Another disadvantage is that the CONTAINSTABLE UDF works only for base tables. In the case where the end-user retrieves a view that, for example, joins two tables, then there is still a problem. This is because the view itself is not associated with any indexes at all, but the two text tables are associated with different indexes. So there is no way for the end-user to supply sufficient index information, even if the end-user knew about the definition of the view.

Automatic Query Rewrite Method For Index UDFs

The above described CONTAINSTABLE UDF exhibits exactly the properties that one usually finds with standard database indexing. For the evaluation of a certain predicate (in this case, the CONTAINS UDF), a special function (index lookup) can be applied that yields an identification of the matching values. For locating the applicable index, the optimizer function of the RDBMS software needs to know the schema, table, and column names for the item involved in the predicate, as well as a value for the actual lookup. These are exactly the input parameters for the CONTAINSTABLE UDF.

If the optimizer function of the RDBMS software knows about the existence of the CONTAINSTABLE UDF and knows that it can be exploited when evaluating the CONTAINS UDF, then the query rewrite method could be performed by the optimizer function of the RDBMS software. This does not need to happen after view expansion but if it does, then the views require no special handling.

Assume the following definition for the CONTAINS UDF:

```
CREATE FUNCTION DB2TX.CONTAINS
(
    DB2TEXTH,         /* HANDLE           */
    LONG VARCHAR      /* SEARCH ARGUMENT  */
)
RETURNS INTEGER
```

Then, this information might be communicated to the RDBMS software through the following (enhanced) definition for the CONTAINSTABLE UDF:

```
CREATE FUNCTION DB2TX.CONTAINSTABLE(
    VARCHAR(8),        /* SCHEMANAME      */
    VARCHAR(18),       /* TABLENAME       */
    VARCHAR(18),       /* COLUMNNAME      */
    LONG VARCHAR )     /* SEARCH ARGUMENT */
RETURNS TABLE( RESULTHANDLE DB2TEXTH )
INDEX FUNCTION FOR CONTAINS( DB2TEXTH, LONG VARCHAR )
INDEX CHECK INDEX_EXISTS (
    VARCHAR(8),
    VARCHAR(18),
    VARCHAR(18) )
COLUMNS 1 AS RESULTHANDLE
VALUE 2
[ RESULT 1 ]
```

With regard to the clause "INDEX FUNCTION FOR CONTAINS (DB2TEXTH, LONG VARCHAR)", this informs the optimizer function of the RDBMS software that the CONTAINSTABLE UDF is an alternative query rewrite (i.e., an index UDF) for the CONTAINS UDF with the given parameter types.

With regard to the clause "INDEX CHECK INDEX_EXISTS (VARCHAR(8), VARCHAR(18), VARCHAR(18) )", this defines a UDF (the INDEX_EXISTS UDF) that can be used to determine whether an index has actually been defined on a certain column. The parameters for the INDEX_EXISTS UDF are the schema name, table name, and column name, which are used to determine whether an index exists on the column by examining the PROTOTYPEHANDLE column of the DB2TX.TEXTCOLUMNS view. Of course, index UDFs can be constructed in accordance with the teachings of the present invention that involve more than one column and the number of parameters for the index UDF would be a multiple of the number of columns.

The INDEX_EXISTS UDF can be used at compile time for the query by the RDBMS software to determine whether an index exists (result !=0) and therefore the query rewrite method can be performed, or whether an index does not exist (result=0) and therefore the query rewrite method cannot be performed. However, the index function itself (i.e., the CONTAINSTABLE UDF) still has to perform such a check at runtime of the query and determine the name of the index from the catalog view (i.e., the PROTOTYPEHANDLE column from the DB2TX.TEXTCOLUMNS view); otherwise, the end-user may have deleted or recreated the index between compile time and runtime, which may result in a different index name. If creation and deletion of these indexes is communicated to the RDBMS software, then a runtime check is not necessary. However, if the creation and deletion of these indexes is not communicated to the RDBMS software, there cannot be an automatic invalidation or recompilation of dependent queries. Therefore, there is no guarantee that the prerequisites (i.e., index existence) for the query rewrite method will be met. Consequently, the index function has to be able to detect these administrative changes at runtime and either adjust to them or generate an appropriate error. This is no different from re-compiling SQL queries at runtime when the query plan chosen by the optimizer gets invalidated because an index managed by the RDBMS software has been dropped or deleted.

With regard to the clause "COLUMNS 1 AS RESULTHANDLE", this specifies: (1) a parameter position of the original CONTAINS UDF, and (2) a field name of the table returned by the index UDF, i.e., the CONTAINSTABLE UDF. The parameter in (1) stores the column item in the original query. In other words, this is the position of the indexed column in the call to the CONTAINS UDF. The field name in (2) specifies the position of the corresponding column in the result table produced by the CONTAINSTABLE UDF.

With regard to the clause "VALUE 2", this specifies the parameter position of the CONTAINS UDF that will take the value being used for the index lookup.

With regard to the clause "[RESULT 1]", this is used to indicate the value of the CONTAINS UDF that corresponds to "true" in terms of matching the search argument. If there were user-defined predicates or UDFs with boolean return values, then this clause would not be needed.

As an alternative, a default assumption could be used that a return value of 1 from the CONTAINS UDF means "true". Then, the "[RESULT 1]" clause would not be needed (which is why it is indicated in brackets). In addition, a default assumption could be made that every return value other than 1 corresponds to "false".

Default assumptions could also be used for some of the other causes as well. If the name of the index UDF and the scalar UDF are the same, then "INDEX FUNCTION FOR CONTAINS (DB2TEXTH, LONG VARCHAR)" is not needed. If changes to the index are tracked, then "INDEX CHECK..." is not needed. If the handle column is the first argument of the scalar UDF and corresponds to the values in the first column of the table produced by the index UDF, then "COLUMNS 1..." can be optional. If the search argument (i.e., the value for the index lookup) is the second argument of the scalar UDF, then "VALUE..." can be optional Query Rewrite Method Given the following (skeleton) definition:

```
CREATE FUNCTION CONTAINSTABLE ( ... )
RETURNS TABLE ( ... )
INDEX FUNCTION FOR CONTAINS ( ... )
INDEX CHECK INDEX_EXISTS(
    VARCHAR(8),
    VARCHAR(18),
    VARCHAR(18) )
COLUMNS <COL> AS <RESULTCOL>
VALUE <ARG>
RESULT <RESULTVAL>
```

Assume that an SQL query received by the RDBMS software has an occurrence of the original UDF with the following pattern (wherein the CONTAINS UDF and INDEX_EXISTS UDF are being used to describe the generic query rewrite method for illustration purposes only):

```
SELECT ...
FROM ...
WHERE CONTAINS( <COLNAME>, <SEARCHARG> ) = <VAL>
``` where the formal parameter name for <COLNAME> in the CONTAINS UDF is <COL>, and the formal parameter name for <SEARCHARG> is <ARG>. Then, the query could be rewritten (provided that the INDEX_EXISTS UDF returns a value not equal to 0) in the following manner. If <VAL>=<RESULTVAL>, then replace:

```
CONTAINS( <COLNAME>, <SEARCHARG> ) = <VAL>
```
with:
```
<COLNAME> IN
    (SELECT <RESTABLENAME>.<RESULTCOL>
     FROM CONTAINSTABLE(
         SCHEMA(<COLNAME>),
         TABLE(<COLNAME>),
         '<COLNAME>',
         <SEARCHARG>)
     AS <RESTABLENAME>)'
```

Otherwise, replace:

```
CONTAINS(<COLNAME>, <SEARCHARG>)=<VAL>
```
with:
```
NOT <COLNAME> IN (
    SELECT <RESTABLENAME>.<RESULTCOL>
    FROM CONTAINSTABLE(
        SCHEMA(<COLNAME>),
        TABLE(<COLNAME>),
        <COLNAME>',
        <SEARCHARG>)
    AS <RESTABLENAME> )
```

In the above, <RESTABLENAME> is a name generated in the query rewrite method, and TABLE and SCHEMA are string variables containing the schema and table names in which <COLNAME> is defined. This information should be available when the query rewrite method is invoked.

Additional Information for the Optimizer Function

The present invention includes certain language constructs for specifying information for the optimizer function of the RDBMS software to decide when the query rewrite method should be applied (other than a check for the existence of the index). For the Text Extender, this information may comprise an estimate of the table size above which the query rewrite method promises performance improvements.

Following is another example for the query rewrite method to demonstrate that the query rewrite method also works for more complex queries. However, the fact that the query rewrite method is really local in the sense that it replaces one predicate occurrence with a different one using the same operands already indicates that there should not be any problems with the query rewrite method for complex queries.

For example, following is a query with multiple occurrences of CONTAINS on the same table:

```
SELECT *
FROM MYSCHEMA.MYTEXTTABLE AS T1,
      MYSCHEMA.MYTEXTTABLE AS T2
WHERE CONTAINS ( T1.HANDLECOL, "'DATABASE'" ) = 1
AND     CONTAINS ( T2.HANDLECOL, "'DB2/6000'" ) = 1
AND     T1.YEAR( DATE ) = T2.YEAR( DATE )
```

The query rewrite method would generate the following:

```
SELECT *
FROM MYSCHEMA.MYTEXTTABLE AS T1,
      MYSCHEMA.MYTEXTTABLE AS T2
WHERE T1.HANDLECOL IN
SELECT RESTABL.RESULTHANDLE
FROM CONTAINSTABLE(
      'MYSCHEMA',
      'MYTEXTTABLE',
      'HANDLECOL',
      "'DATABASES'" )
AS RESTABL )
AND T2.HANDLECOL IN
(SELECT RESTAB2.RESULTHANDLE
FROM CONTAINSTABLE(
      'MYSCHEMA',
      'MYTEXTTABLE',
      'HANDLECOL',
      "'DB2/6000'" ) )
AS RESTAB2)
AND T1.YEAR( DATE ) = T2.YEAR( DATE )
```

View Support

If views are involved in the queries, then a few assumptions must be made on the view expansion and query rewrite method. Consider the following simple view definition:

```
CREATE VIEW MYSCHEMA.MYTEXTVIEW AS
( SELECT *
FROM MYSCHEMA.MYTEXTTABLE1 )
UNION
( SELECT *
FROM MYSCHEMA.MYTEXTTABLE2 )
```

Also, consider the following query:

```
SELECT *
FROM MYSCHEMA.MYTEXTVIEW
WHERE CONTAINS(
      HANDLECOL,
      "'DATABASES' | 'DB2/6000'" ) = 1
```

Assume that at some point after view expansion, there is a query (or a query graph model) equivalent to the following:

```
(SELECT *
FROM MYSCHEMA.MYTEXTTABLE1
WHERE CONTAINS(
      HANDLECOL,
      "'DATABASES' | 'DB2/6000'" ) = 1 )
UNION
(SELECT *
FROM MYSCHEMA.MYTEXTTABLE2
WHERE CONTAINS(
      HANDLECOL,
      "'DATABASES' | 'DB2/6000'" ) = 1
```

In the above example, the search predicate from the original query has already been pushed into the (expanded) view definition. Then, the query rewrite method would generate the following:

```
(SELECT *
FROM MYSCHEMA.MYTEXTTABLE1
WHERE HANDLECOL IN
(SELECT RESTABL.RESULTHANDLE
FROM CONTAINSTABLE(
      'MYSCHEMA',
      'MYTEXTTABLE1',
      'HANDLECOL',
      "'DATABASES' | 'DB2/6000'" )
AS RESTABL ) )
UNION
(SELECT *
FROM MYSCHEMA.MYTEXTTABLE2
WHERE HANDLECOL IN
(SELECT RESTAB2.RESULTHANDLE
FROM CONTAINSTABLE
      'MYSCHEMA',
      'MYTEXTTABLE2',
      'HANDLECOL',
      "'DATABASES' | 'DB2/6000'" )
AS RESTAB2 ) )
```

The above query rewrite has the original CONTAINS UDF already pushed into the subqueries on the individual base table, which is essential for the query rewrite method, because otherwise there does not seem a way to provide the correct input and number of calls of the CONTAINSTABLE UDF.

Further Discussion

The above approach supports the query rewrite of other UDFs that return an integer value that is interpreted as a boolean value (e.g., 1=true, 0=false). However, a UDF could return other (numeric or non-numeric) values and appear as an operand of an arbitrary SQL predicate. The following describes how these cases can be handled.

Assume the following definition for the RANK UDF:

```
CREATE FUNCTION RANK(
      DB2TEXTH,            /* HANDLE */
      LONG VARCHAR )       /* SEARCH ARGUMENT */
RETURNS DOUBLE
```

This UDF behaves like the CONTAINS UDF, but returns a rank value instead of a pseudo-boolean value that describes how well a document meets the search criteria. For example, consider the following query:

```
SELECT *
FROM MYSCHEMA.MYTEXTTABLE
WHERE RANK(
      HANDLECOL,
      "'DATABASES' | 'DB2/6000'" ) > 0.5
```

The above query would retrieve all text information for documents that match the search argument "'DATABASES'|'DB2/6000'" with a rank value >0.5 (rank values range between 0 and 1).

The index UDF would therefore need additional arguments for capturing the predicate and operands in the predicate. The CREATE FUNCTION statement for the index UDF would look something like the following:

```
CREATE FUNCTION RANKTABLE(
    VARCHAR(8),      /* SCHEMANAME          */
    VARCHAR(18),     /* TABLENAME           */
    VARCHAR(18),     /* HANDLECOLUMN        */
    LONG VARCHAR,    /* SEARCH ARGUMENT     */
    VARCHAR(18),     /* PREDICATE - NEW     */
    DOUBLE)          /* SECOND OPERAND - NEW */
RETURNS TABLE( RESULTHANDLE DB2TEXTH )
INDEX FUNCTION FOR RANK ( DB2TEXTH, LONG VARCHAR )
INDEX CHECK INDEX_EXISTS
    VARCHAR(8),
    VARCHAR(18),
    VARCHAR(18),
    VARCHAR(18) )    /* PREDICATE - NEW     */
COLUMNS 1 AS RESULTHANDLE
VALUE 2
```

There are two significant changes (marked by the comments "NEW") when compared with the approach outlined above for boolean functions. First, additional parameters have been added for communicating the predicate (in textual form) and the second operand involved in the predicate to the index UDF. At runtime, these parameters will store the predicate (i.e., ">") and the second parameter (i.e., "0.5") of the comparison.

Second, the INDEX_EXISTS UDF has been extended to include an additional parameter that holds the predicate (i.e., ">"). This parameter is used by the INDEX_EXISTS UDF to determine whether the indexing function can interpret the predicate. If the predicate cannot be interpreted by the indexing function, then the INDEX_EXISTS UDF returns an appropriate error code at compile-time to prohibit the query rewrite.

The automatic query rewrite method for the above query would then result in the following query:

```
SELECT *
FROM MYSCHEMA.MYTEXTTABLE
WHERE HANDLECOL IN
(SELECT RESTAB.RESULTHANDLE
 FROM RANKTABLE(
     'MYSCHEMA',
     'MYTEXTTABLE',
     'HANDLECCL',
     '"DATABASES" ! "DB2/6000"',
     '>',
     0.5 )
 AS RESTAB )
```

Note that the query rewrite above is generic in the sense that it can be used by the other Relational Extenders, once search UDFs have been developed and integrated into the RDBMS software, and in other UDT/UDF-based applications or RDBMS extensions that follow a similar approach as the Relational Extenders. Essentially, all approaches that work with a handle-like identification of database rows, and use special functionality for indexing content that is identified by the handles would benefit from the query rewrite method of the present invention.

If user-defined or external indexing are to be supported by the RDBMS software, which is a important requirement with the support of UDTs and UDFs, then there is only one alternative to the approach described herein: allow the type definer to "teach" the RDBMS software about new index types (text, video, audio, etc.) and expose an application programming interface (API) that permits to define the type of index to be created for specific UDTs, as well as define which functions/predicates would exploit this index. This approach would require extensibility at a much deeper system level than the current approach for UDTs and UDFs. It would actually allow the type definer to integrate UDTs into the RDBMS software as being no different than the existing base types.

The query rewrite method of the present invention would also work in the future with value Abstract Data Types (ADTs), row types, reference types, and collection types, as specified in the SQL3 standard. In the Text Extender, for example, the handle would be replaced by an ADT value, which would contain a "uid" attribute that identifies the ADT inside the column of a table, then this id attribute could be used to locate the ADT values in the original table.

Implementation of the Present Invention

Figure 2:
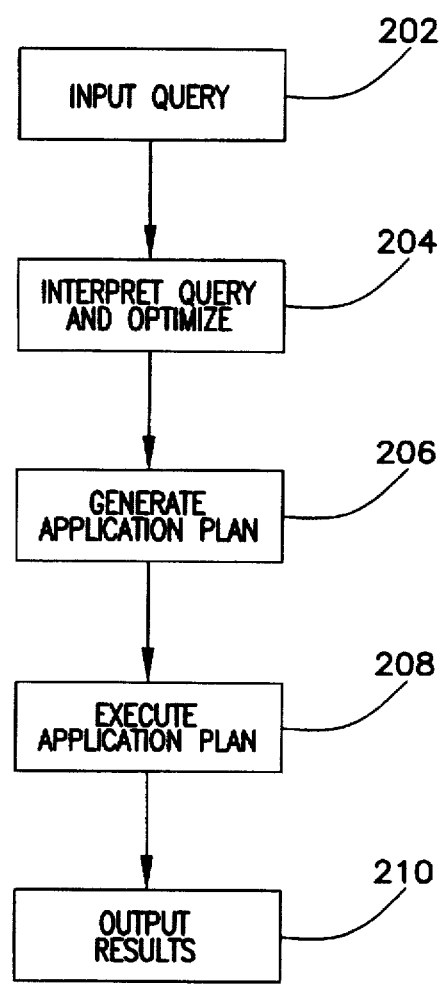
FIG. 2 is a flowchart illustrating the steps performed by the DB2 server program for the interpretation and execution of an SQL query according to the present invention.
Figure 3:
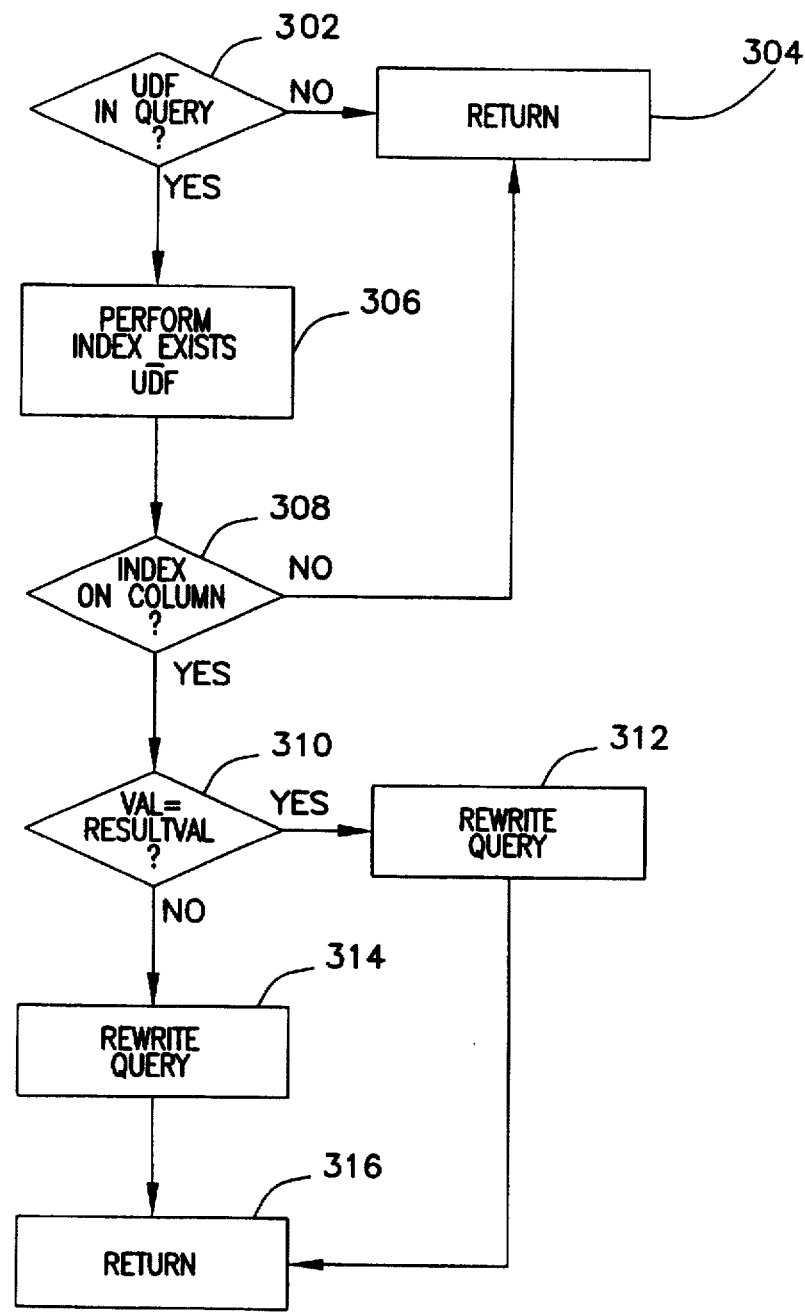
FIG. 3 is a flowchart illustrating the method of optimizing an SQL query according to the present invention.
Figure 4:
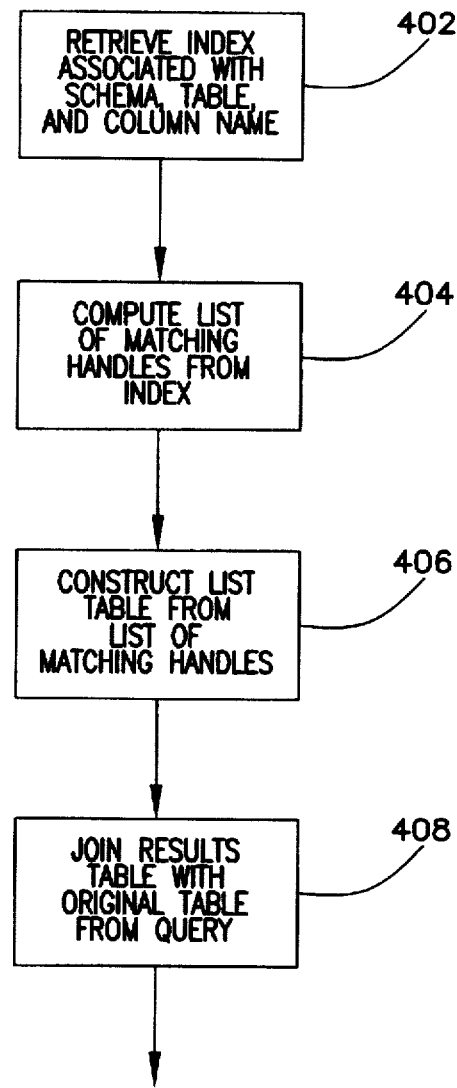
FIG. 4 is a flowchart illustrating the method of performing an SQL query according to the present invention.

FIGS. 2–4 illustrate the logic performed by the various components of the RDBMS software in implementing the present invention.

Interpretation and Execution of SQL

FIG. 2 is a flowchart illustrating the steps performed by the DB2 server program 108 in the interpretation and execution of SQL queries. These steps represent the general logic performed for processing SQL regardless of its method of input, i.e., interactive, embedded in source code, or invoked via call level interface.

Block 202 represents the input of an SQL query into the server computer 102. Block 204 represents the server computer 102 compiling or interpreting the SQL query. An optimization function within block 204 may transform the SQL query in a manner described in more detail later in this specification. Block 206 represents the server computer 102 generating a compiled set of runtime structures called an application plan from the compiled SQL query. Generally, the SQL query received as input from the user specifies only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the server computer 102 executing the application plan, and block 210 represents the server computer 102 outputting the results of the application plan to the client computer 100.

Optimization of SQL Queries by Index UDF Substitution

FIG. 3 is a flowchart illustrating the method of optimizing SQL queries according to the present invention at step 204 in FIG. 2, wherein an index UDF (for example, the CONTAINSTABLE UDF) has been defined as a substitute for a given UDF (for example, the CONTAINS UDF).

Block 302 represents the optimizer function of the RDBMS software determining whether the SQL query includes a UDF with the following pattern:

```
SELECT ...
FROM ...
WHERE UDF-NAME( <COLNAME>, <SEARCHARG> ) = <VAL>
``` where the formal parameter name for <COLNAME> in UDFNAME is <COL>, and the formal parameter name for <SEARCHARG> is <ARG>. If not, control transfers to block 304, which terminates the query rewrite and returns to the calling procedure. Otherwise, control transfers to block 306, which indicates that the query rewrite can be performed.

Block 306 represents the optimizer function of the RDBMS software executing an associated INDEX_EXISTS UDF.

Block 308 is a decision block that determines whether the INDEX-EXISTS UDF returns a value indicating that an index exists for <COLNAME>. If not, control transfers to block 304, which terminates the query rewrite and returns to the calling procedure. Otherwise, control transfers to block 310, which indicates that the query rewrite can be performed. Note that this entire section could be omitted in some implementations.

Block 310 represents the optimizer function of the RDBMS software determining whether <VAL>= <RESULTVAL>. If so, control transfers to block 312, which replaces:

UDF-NAME(<COLNAME>, <SEARCHARG>)<VAL> in the SQL query with:

```
<COLNAME> IN
  (SELECT <RESTABLENAME>.<RESULTCOL>
   FROM INDEX-UDF-NAME(
      SCHEMA(<COLNAME>),
      TABLE(<COLNAME>),
      '<COLNAME>',
      <SEARCHARG>)
   AS <RESTABLENAME>)'
```

Note that the above example is just one of many possible SQL queries. One may choose to transform the original query into a join instead of the above subquery. In fact, it is likely that it will be transformed into a join in many cases. It is important to understand that the present invention is applicable to any transformed SQL query that is semantically similar to the one used for illustration purposes in this application.

If <VAL> is not <RESULTVAL>, then control transfers to block 314, which replaces:

UDF-NAME(<COLNAME>, <SEARCHARG>)=<VAL> in the SQL query with:

```
NOT <COLNAME> IN (
   SELECT <RESTABLENAME>.<RESULTCOL>
   FROM INDEX-UDF-NAME(
      SCHEMA(<COLNAME>),
      TABLE(<COLNAME>),
      '<COLNAME>',
      <SEARCHARG>)
   AS <RESTABLENAME> )
```

In the above, <RESTABLENAME> is a name generated in the query rewrite method, and TABLE and SCHEMA are string variables containing the schema and table names in which <COLNAME> is defined.

Block 316 terminates the query rewrite and returns to the calling procedure.

Execution of SOL Queries Having Index UDF Substitution

FIG. 4 is a flowchart illustrating the method of performing an SQL query according to the present invention at step 208 in FIG. 2, wherein the SQL query has been optimized in FIG. 3 by substituting an index UDF (for example, the CONTAINSTABLE UDF) for a given UDF (for example, the CONTAINS UDF).

Block 402 represents the software retrieving the name of the index associated with the column being referenced in the original query. This column is identified by a schema name, table name, and the name of the column.

Block 404 represents the software computing a list of matching handles from the index.

Block 406 represents the software constructing a result table from the list of matching handles, wherein the result table contains one row per matching document.

Block 408 represents the software joining the result table with the original table in the SQL query. The results from this join operation are then returned to the end-user.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for optimizing queries in a database management system, wherein the queries comprise content-based searches of data types that are supported through the use of indexing techniques not known or available to the database management system. The queries are automatically rewritten or optimized to take advantage of the indexing techniques.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a computer having a memory, the query being performed by the computer to retrieve data from a database stored on a data storage device coupled to the computer, the method comprising the steps of:
   (a) accepting a query into the memory of the computer;
   (b) rewriting the query in the memory of the computer by substituting therein a reference to a user-defined index function for a reference to an associated user-defined non-index function; and
   (c) performing the query in the memory of the computer, including performing the user-defined index function.

2. The method of claim 1 above, wherein the query references a user-defined data type, the user-defined index function operates on the user-defined data type, and the step of performing the user-defined index function comprises the step of performing the user-defined index function using a relational extender associated with the user-defined data type.

3. The method of claim 1 above, wherein the rewriting step further comprises the step of optimizing the query in the memory of the computer.

4. The method of claim 1 above, wherein the step of rewriting the query comprises the steps of:
   determining whether the user-defined index function exists for the user-defined function specified in the query;

determining whether an index has been defined for a column referenced by the user-defined function specified in the query; and replacing the user-defined function with the user-defined index function when the user-defined index function is determined to exist for the user-defined function specified in the query and the index is determined to have been defined for the column referenced by the user-defined function specified in the query.

5. The method of claim 4 above, wherein the step of determining whether an index has been defined for a column referenced by the user-defined function specified in the query comprises the step of retrieving a name of the index using a schema name, table name, and column name from the query.

6. An apparatus for optimizing query, comprising:

(a) a computer having a memory and a data storage device coupled thereto, wherein the data storage device stores a relational database;

(b) means, performed by the computer, for accepting a query into the memory of the computer;

(c) means, performed by the computer, for rewriting the query in the memory of the computer by substituting therein a reference to a user-defined index function for a reference to an associated user-defined non-index function; and (d) means, performed by the computer, for performing the query in the memory of the computer, including means for performing the user-defined index function.

7. The apparatus of claim 6 above, wherein the query references a user-defined data type, the user-defined index function operates on the user-defined data type, and the means for performing the user-defined index function comprises means for performing the user-defined index function using a relational extender associated with the user-defined data type.

8. The apparatus of claim 6 above, wherein the means for rewriting further comprises means for optimizing the query in the memory of the computer.

9. The apparatus of claim 6 above, wherein the means for rewriting comprises:

means for determining whether the user-defined index function exists for the user-defined function specified in the query;

means for determining whether an index has been defined for a column referenced by the user-defined function specified in the query; and means for replacing the user-defined function with the user-defined index function when the user-defined index function is determined to exist for the user-defined function specified in the query and the index is determined to have been defined for the column referenced by the user-defined function specified in the query.

10. The apparatus of claim 8 above, wherein the means for determining whether an index has been defined for a column referenced by the user-defined function specified in the query comprises means for retrieving a name of the index using a schema name, table name, and column name from the query.

11. A program medium readable by a computer having a memory and embodying one or more programs of instructions executable by the computer to perform method steps for optimizing query, the query being performed by the computer to retrieve data from a database stored in an data storage device coupled to the computer, the method comprising the steps of:

(a) accepting a query into the memory of the computer;

(b) rewriting the query in the memory of the computer by substituting therein a reference to a user-defined index function for a reference to an associated user-defined non-index function; and (c) performing the query in the memory of the computer, including performing the user-defined index function.

12. The method of claim 11 above, wherein the query references a user-defined data type, the user-defined index function operates on the user-defined data type, and the step of performing the user-defined index function comprises the step of performing the user-defined index function using a relational extender associated with the user-defined data type.

13. The method of claim 11 above, wherein the rewriting step further comprises the step of optimizing the query in the memory of the computer.

14. The method of claim 11 above, wherein the step of rewriting the query comprises the step of retrieving a name for the index using a schema name, table name, and column name from the query.

* * * * *

UNITED STATES PATENT AND TRADEMARK OFFICE
CERTIFICATE OF CORRECTION

PATENT NO. : 5,765,147
DATED : June 9, 1998
INVENTOR(S) : Nelson Mendonca Mattos and Stefan Dessloch It is certified that error appears in the above-identified patent and that said Letters Patent is hereby corrected as shown below:

Cover Page, Column 2, Other Publications, in the "Database 2 Text Extender..." reference delete "1-99" and replace with --1-199--

Column 11, Line 64, after ""DB2/6000"') = 1" insert --)--

Column 14, Line 18, delete "SOL" and replace with --SQL--

Column 14, Line 45, delete "SOL" and replace with --SQL--

Column 15, Line 62, delete "SOL" and replace with --SQL--

Signed and Sealed this

Twenty-first Day of March, 2000

Attest:

Attesting Officer

Q. TODD DICKINSON

Commissioner of Patents and Trademarks